INVENTOR
W. B. GAUNT, JR.
BY James W. Falk
ATTORNEY

Nov. 26, 1968 W. B. GAUNT. JR 3,413,418

TIME-DIVISION MULTIPLEX TELEPHONE SYSTEM WITH INSERTION LOSS EQUALIZATION

Filed Nov. 23, 1965 4 Sheets-Sheet 2

Nov. 26, 1968 W. B. GAUNT, JR 3,413,418

TIME-DIVISION MULTIPLEX TELEPHONE SYSTEM WITH INSERTION LOSS EQUALIZATION

Filed Nov. 23, 1965 4 Sheets-Sheet 3

United States Patent Office 3,413,418
Patented Nov. 26, 1968

3,413,418
TIME-DIVISION MULTIPLEX TELEPHONE SYSTEM WITH INSERTION LOSS EQUALIZATION

Wilmer B. Gaunt, Jr., New Shrewsbury, N.J., assignor to Bell Telephone Laboratories, Incorporated, New York, N.Y., a corporation of New York Filed Nov. 23, 1965, Ser. No. 509,356
9 Claims. (Cl. 179—15)

ABSTRACT OF THE DISCLOSURE

A time-division multiplex system in which groups of lines are connected together through an intergroup bus is described. The insertion losses of signal transmission between lines within a group and lines of two different groups are equalized by connecting an inductance between the common bus of each group and the intergroup bus. The added circuit elements permit complete resonant transfer without increasing the resonant transfer sampling period.

This invention relates to time-division switching systems and more particularly to resonant transfer circuits which reduce the insertion loss contrast between interbus and intrabus connections in such systems.

In time division switching systems a plurality of telephone lines are connected to a common bus through respective gating circuits or gates. Two particular lines may be connected together by operating their respective gates in the same time slot of the system. Although the lines are electrically connected to each other for only a fraction of each complete cycle of system operation, if the gates are operated at a fast enough rate it will appear to the two parties on the lines that they are connected together continuously.

The principle of resonant transfer in such time-division multiplex switching systems is well known in the art; the resonant transfer principle is disclosed in W. D. Lewis Patent 2,936,337, May 10, 1960. Each line circuit in a time-division system includes a low-pass filter and a capacitor. In accordance with resonant transfer principles, an inductor, in series with the respective gate and between the capacitor and the gate connects each line to the bus. Thus when the two line gates are operated, the two pairs of capacitor-inductor configurations form a resonant circuit.

Initially the voltage across each capacitor represents a sample of the signal to be transmitted by the respective line. If the two gates are operated for a time interval equal to one-half the period of the resonant circuit, then when the gates are opened the voltages on the two capacitors will have been interchanged. In this way, by means of resonant transfer, a sample from each line is delivered to the other. The low-pass filters smooth the samples received by each line in order that a continuous signal be extended to each telephone set.

Because the gates must be operated at a rate sufficient to extract enough samples of each waveform in order to reconstitute it, there is a maximum limit to the period of each cycle of system operation. Since there is also a lower limit to the time period in which the gates can operate, it is apparent that there is a maximum limit to the number of lines which may be connected to the same bus. In many systems it is necessary to interconnect a number of lines greater than the number of lines which can be interconnected via a single time-division bus. For this reason a time-division system may provide many group busses together with one or more intergroup busses; one such system is disclosed in Browne-Gaunt-Goldschmidt-Vigliante-Williford-York application Ser. No. 509,375, filed Nov. 23, 1965. A group of lines is connected to each group bus and if a connection is to be established between two lines associated with the same group bus, their respective gates are operated in the same time slot. Suppose, however, that it is necessary to interconnect two lines associated with different group busses. The two respective gates are operated in the same time slot but this merely causes the two lines to be electrically connected to the two different respective group busses. The two group busses are in turn interconnected by one of the intergroup busses. A cable is extended from each group bus to each intergroup bus, each cable including a gate. To interconnect two group busses it is only necessary to operate the gates in two of the cables which connect the two group busses to one of the intergroup busses. Thus an intergroup connection requires the simultaneous operation of four gates while an intragroup bus connection requires the simultaneous operation of only two gates.

For a resonant transfer operation to take place it is necessary that the full charge on each of the storage capacitors be completely transferred to the other. If less than the full charge on each capacitor is transferred to the other, the signal level is attenuated, i.e., there is insertion loss. An ideal resonant transfer is possible only if the resonant transfer circuit includes only inductors and capacitors, and only if the gates are closed for a timing interval equal to one-half the period of natural oscillation of the circuit. A problem encountered in prior art time-division multiplex switching systems is that the insertion loss of an intergroup (interbus) connection is greater than the insertion loss of an intragroup (intrabus) connection because in an intrabus connection there are four gates in the connection, rather than only two. Thus, there is additional resistance which introduces additional comparative loss in the resonant path.

It is a general object of this invention to reduce the insertion loss contrast between intrabus and interbus connections in a time-division switching system.

One approach to the problem is to provide additional amplification for interbus connections. This is both difficult and expensive because the amplification must be bilateral. I have discovered, however, that to improve the operating characteristics of a time-division switching system one primary objective is to equalize the two insertion losses, rather than to decrease the insertion loss of an interbus connection. This is due primarily to the fact that some signal attenuation is tolerable, and furthermore, if it is not, amplification can be provided in other parts of the system. Thus, the nominal absolute insertion losses for interbus and intrabus connections are not in themselves serious problems. The real trouble is that there is an insertion loss contrast. A talking party or a measuring instrument receives a higher signal level, i.e., hears a louder voice or indicates a higher reading on an intrabus connection than on an interbus connection. With the problem thus understood in its true perspective, it is apparent that the operating characteristics of the system can be improved if either the insertion loss of an intrabus connection can be increased, or if the insertion loss of an interbus connection can be decreased.

It is another object of this invention to increase the insertion loss of an intrabus connection.

It is still another object of this invention to increase this insertion loss, without affecting the return loss, in the simplest and most inexpensive manner, and in a way such that existing systems can be modified with a minimum amount of change.

In the illustrative embodiment of the invention the insertion loss contrast is reduced simply by placing an inductor or an equivalent impedance (such as a long-low capacitance cable) in each cable which connects a group bus to an intergroup bus. On an interbus connection the transfer circuit thus has added to it two of these new inductors. By merely increasing the sampling pulse width or pulse period of the system (the time interval during which the gates are operated on both intrabus and interbus connections), the interbus resonant transfer operation is unaffected. However, the intrabus insertion loss is increased. In such an intrabus connection the two lines are connected to the same group bus. In shunt with this bus is the additional inductor connected to an intergroup bus, even though the intergroup bus is not connected by a second cable to another group bus. The effect of the shunt inductor is to increase the insertion loss of the intrabus connection as will be described in detail below.

It is a feature of my invention to equalize the insertion loss of intragroup and intergroup bus connections. More specifically it is a feature of my invention to include an inductor or equivalent impedance in each cable which connects a group bus to an intergroup bus in a time-division multiplex switching system.

It is a further feature of my invention to provide circuitry so that the inductor or equivalent impedance is included in series in each intergroup bus connection but is included in shunt in each intragroup bus connection.

These and other objects, features, and advantages of my invention will become apparent upon consideration of the following detailed description in conjunction with the drawing, in which.

Figure 6:
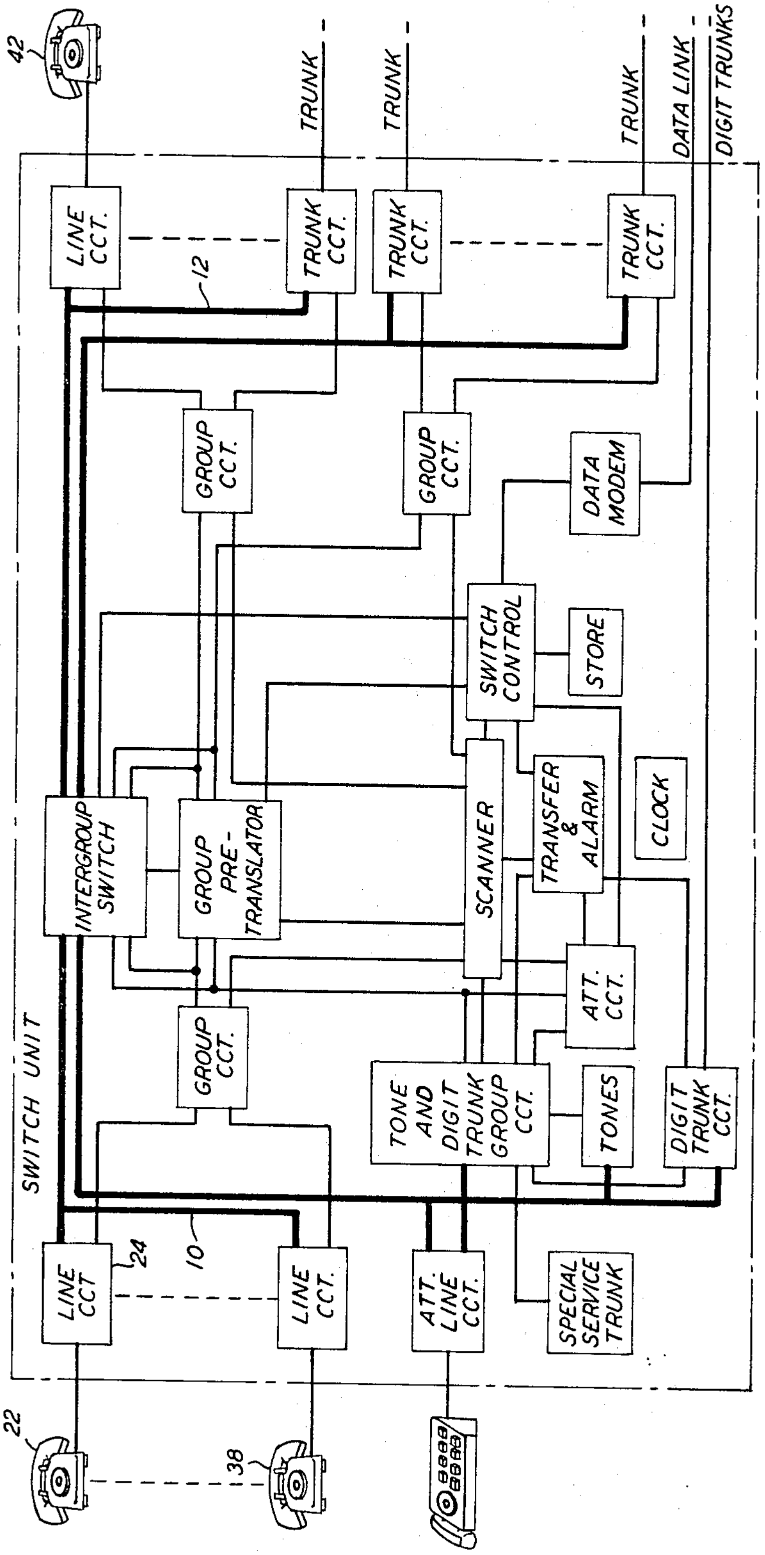
FIG. 6 is a block diagram of a switch unit of a time-division switching system in which my present invention may be incorporated.

FIG. 6 discloses a time-division switch unit as disclosed in Browne-Gaunt-Goldschmidt-Vigliante-Williford-York application Ser. No. 509,375, filed on even date herewith. Reference may be made to that application for a disclosure and description of various control and other circuitry, a detailed description of which is not required for a full understanding of my present invention. Reference may also be made to Seley-Vigliante-Williams application Ser. No. 252,797, filed Jan. 21, 1963, now Patent 3,268,669, issued Aug. 23, 1966, for a description of a control unit of the type which may cooperate with the switch of FIG. 6, over the data link and digit trunks, for controlling the switch unit.

As seen in FIG. 6 subscriber sets, such as 22 and 38, may be connected to a first time division group bus 10, while other subscriber sets, such as set 42, and other communication lines, such as trunks, may be connected to a second time division group bus 12. Other group busses may also be provided. Subscriber sets 22 through 38 may be connected together via bus 10 by their respective line circuit gates and similarly set 42 may be connected to any of the trunk circuits via bus 12. However, to connect a set such as set 22 to set 42 it is necessary to utilize an intergroup bus included in the intergroup switch.

The arrangement of my invention can be best understood without further reference to the system environment in which my invention will be utilized or to the specific control circuitry for operating the various gate circuits; such systems and control circuits are known and the disclosures of the above noted applications may be considered as incorporated herein for such disclosure.

Figure 1:
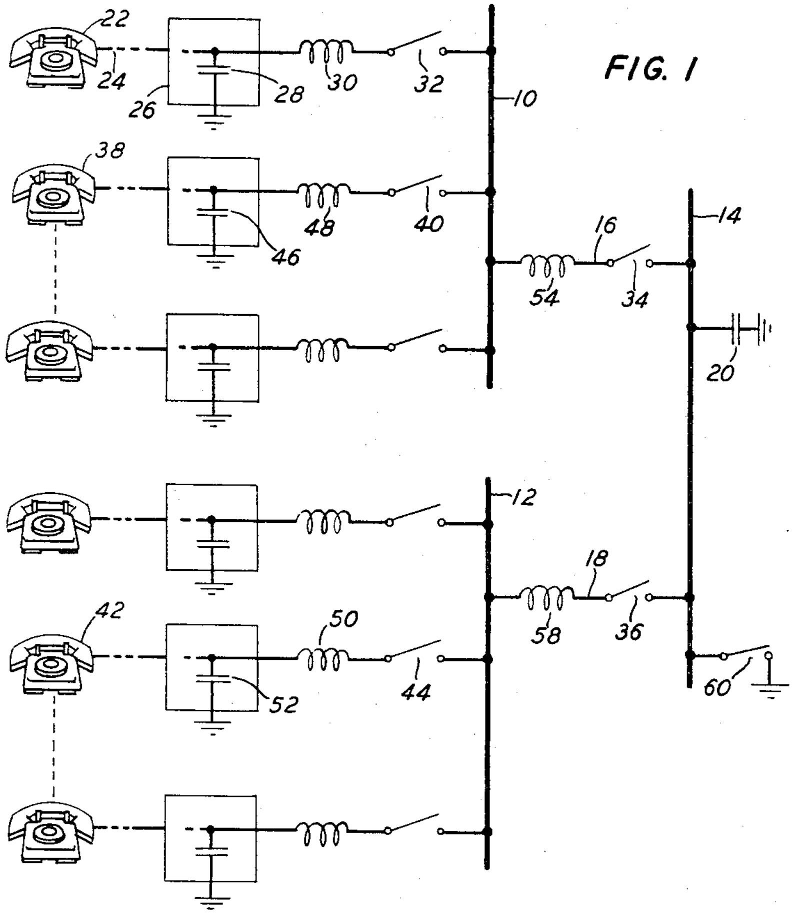
FIG.1 is an illustrative embodiment of the invention, which is the same as prior art systems except for inclusion of inductors 54 and 58.

In FIG. 1 only the two group busses 10 and 12 and one intergroup bus 14 are shown. Each of the group busses is connected by a respective one of cables 16 and 18 to the intergroup switch of FIG. 6; specifically, in accordance with an aspect of my invention, each of the group busses is connected through an inductor 54 and 58 and respective gates 34 and 36 in cables 16 and 18, respectively, to the intergroup bus 14. Additionally, a capacitor 20 shunts the intergroup bus 14 to ground and a further gate 60 connects the intergroup bus 14 to ground.

As indicated in FIG. 6, a time-division switching system incorporating my invention may include other group and intergroup busses and connecting cables, but the operation of systems in accordance with my invention may be most readily understood by considering the connections to only the three busses shown in FIG. 1. Further, the various gates depicted in FIG. 1 and the subsequent figures are only shown symbolically in the drawing; they advantageously are electronic gates, as is known in the art.

Each telephone set is connected to a respective group bus through various circuit elements. Set 22, for example, is connected to bus 10 through line circuit 24, which may include supervisory circuits and scan point circuitry, as is known in the art, through a low-pass filter 26 which includes a capacitor 28, and through an inductor 30 and a gate 32. Sets 38 and 42 are similarly connectable to busses 10 and 12, respectively, through the gates 40 and 44.

As noted above, capacitor 20 shunts the intergroup bus 14 to ground, in accordance with prior art practice. The purpose of the capacitor, whose value is two-thirds that of the capacitors included in each of the low-pass filters, is to provide satisfactory resonant transfer (often termed harmonic transfer) in practical systems in which stray bus capacitance exists. The use of this capacitor is described in Patent 3,062,919 issued to W. E. W. Jacob on Nov. 6, 1962. The gate 60 is included to dissipate energies left on capacitor 20 which could cause crosstalk. Gate 60 is operated at the end of each time slot when the previously closed ones of the other gates have opened. The operation of gate 60 thus discharges capacitor 20 at the end of each time slot.

Figure 2A:
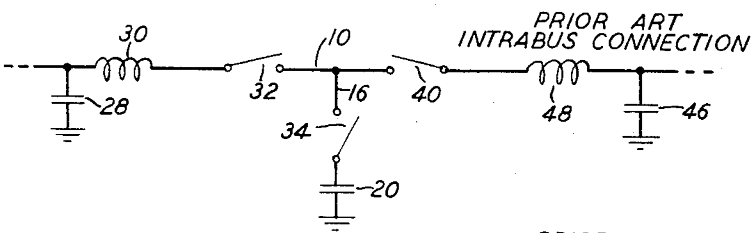
FIGS. 2A and 2B show the elements involved in typical prior art intrabus and interbus connections.
Figure 2B:
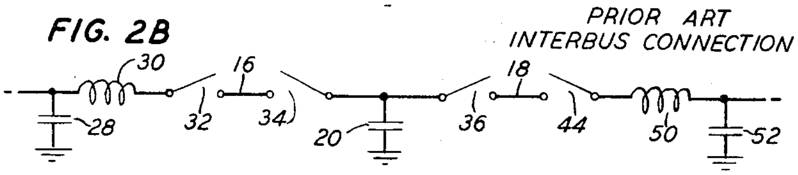

The system of FIG. 1 is the same as prior art systems except for the addition of inductors 54 and 58. Neglecting these two inductors for the moment, FIGS. 2A and 2B show typical prior art intrabus and interbus connections. Consider an intrabus connection in which telephone sets 22 and 38 are interconnected. The operations of gates 32 and 40 connect the two respective lines to group bus 10. At the same time that gates 32 and 40 are operated, gate 34 is operated to connect bus 10 via cable 16 to intergroup bus 14, and through capacitor 20 to ground. The latter connection is included for the reasons described in the above-identified Jacob patent. Initially, each of capacitors 28 and 46 contains a voltage across it which represents a sample of the signal in the respective line. Inductors 30 and 48 and the two capacitors form a resonant circuit; and if gates 32 and 40 are closed for a time interval equal to one half the period of natural oscillation, the charges on the two capacitors switch. In this manner a sample from each line is delivered to the other.

In the prior art interbus connection of FIG. 2B telephone sets 22 and 42 are connected together. For this connection to be established the four gates 32, 34, 36 and 44 must be operated. The operations of gates 34 and 36 are essential for the resonant transfer operation itself to take place for it is by way of cables 16 and 18 that the two busses 10 and 12 are connected together. On the other hand, in the intrabus connection, FIG. 2A, gate 34 simply closes capacitor 20 to the group bus 10 which provides for "harmonic transfer" action.

The resonant circuit for the interbus connection, FIG. 2B, includes the two inductors 30 and 50, and the two capacitors 28 and 52. Since all of the low-pass filter capacitors in the system are of the same value and since all of the line inductors are of the same value, the periods of natural oscillation of the present circuits of both FIGS. 2A and 2B ideally are the same, and consequently the sampling pulse periods are the same for the two types of connection.

An examination of FIGS. 2A and 2B shows why the insertion loss of a practical prior art interbus connection is greater than that of an intrabus connection. In the interbus connection four gates are operated rather than two, and since each gate introduces some resistance in the resonant circuit, there is a greater attenuation of the samples as they are transferred between the capacitors.

Figure 3A:
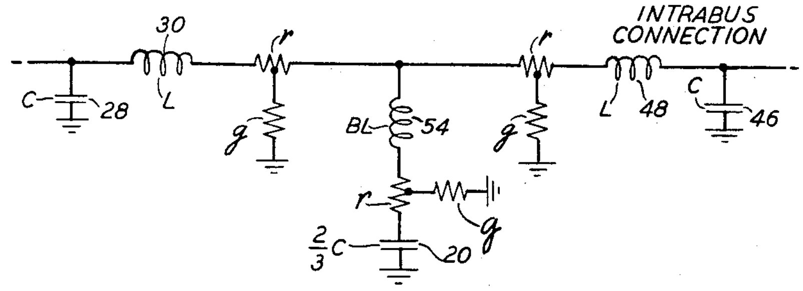
FIGS. 3A and 3B show the elements involved in typical intrabus and interbus connections in the system of FIG. 1, in which the various gates are shown by their electrical equivalents.
Figure 3B:
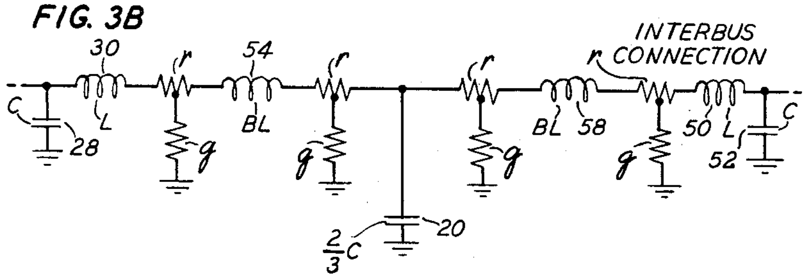

FIGS. 3A and 3B depict the intrabus and interbus connection circuitry in accordance with my invention. FIGS. 3A and 3B include the same elements as respective FIGS. 2A and 2B except that the various gates are shown by their electrical equivalents, each gate comprising a series resistance $r$ and a shunt conductance $g$ (typical values being 1.2 ohms and $\frac{1}{5000}$ ohms, respectively). Furthermore, in accordance with my invention, in FIGS. 3A and 3B inductor 54 is shown in cable 16 and inductor 58 is shown in cable 18, these inductors being included in the actual connections established in the system of FIG. 1. The respective magnitudes of the various elements are also shown. The magnitude of capacitor 20 is two thirds that of each of the line capacitors, and the magnitude of each of inductors 54 and 58 is the same as the magnitude of each of the line inductors multiplied by the constant B (which typically is on the order of 0.15).

With the addition of inductors 54 and 58 in the system, it is apparent that the period of natural oscillation of the resonant circuit in an interbus connection (FIG. 3B) is increased. By increasing the width of the sampling pulse period the ideal resonant transfer still takes place except for the attenuation introduced by the four gates. Since these four gates are also included in the prior art interbus connection, it is apparent that if the width of the sampling pulse is increased slightly to compensate for the addition of inductors 54 and 58, the insertion loss of an interbus connection in the system of FIG. 1 is the same as the insertion loss of an interbus connection in a prior art system which does not include the cable inductors. The reason for including the cable inductors at all is to purposely increase the insertion loss of an intrabus connection. As seen in FIG. 3A, only one of the cable inductors is included in each intrabus connection, and this inductor is in shunt with the resonant circuit rather than in series with it. As will be described below, this shunt inductor, which is not included in an intrabus connection of prior art systems, causes the insertion loss of an intrabus connection in the system of FIG. 1 to be increased.

Figure 4A:
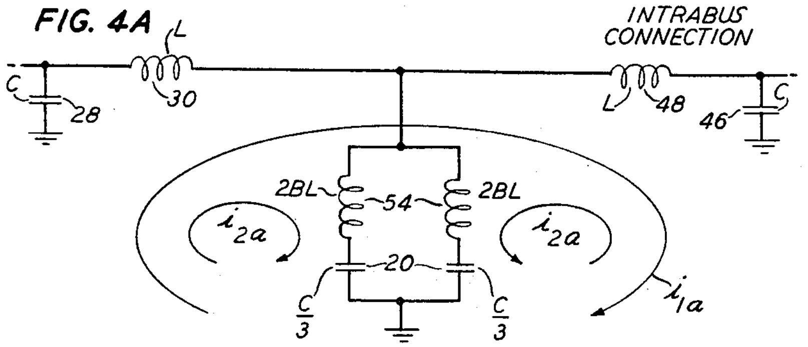
FIGS. 4A and 4B are simplified equivalent circuits based on the circuits of FIGS. 3A and 3B which are helpful for analytical purposes.
Figure 4B:
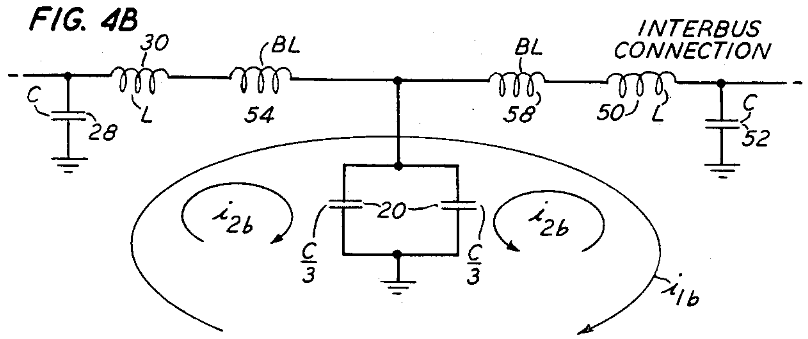

FIGS. 4A and 4B are the same as FIGS. 3A and 3B except that the various gates have been omitted. The purpose of the following qualitative analysis is to show that the shunt inductor in an intrabus connection increases the insertion loss with respect to that of an interbus connection. This can be shown qualitatively without considering the losses introduced by the gates. Also, the stray capacitance of cables 16 and 18 will not be considered in the qualitative analysis which follows because the purpose of the analysis is to show that the shunt inductor does not degrade an interbus connection but does provide an incremental loss in an intrabus connection. By assuming the connections to be nondissipative and by neglecting cable capacitance, this incremental loss is more easily understood. It should be noted that capacitor 20 in FIG. 3B is shown as two capacitors in FIG. 4B. A single capacitor of value 2C/3 is the same as two parallel capacitors each of magnitude C/3. Similarly, a series inductor-capacitor circuit, where the inductor has a magnitude BL and the capacitor has a magnitude 2C/3 (FIG. 3A), is the same as two parallel inductor-capacitor circuits, each circuit comprising an inductor of magnitude 2BL in series with a capacitor of magnitude C/3 (FIG. 4A).

The two circuits of FIGS. 4A and 4B may be analyzed by assuming that the right-hand capacitor in each circuit is initially uncharged and the left-hand capacitor in each circuit initially contains a sample, e.g., of 1-volt magnitude. If this situation exists at the beginning of the sampling period, in the ideal case at the end of the sampling period the voltage across the right-hand capacitor should be one volt and there should be no voltage across the left-hand capacitor in each case. The effect of the cable inductors on the two types of connection may be best understood by considering the loop currents shown in each of FIGS. 4A and 4B, the two inner loop currents being equal in each case due to the symmetry of the connections (which result can be borne out quantitatively).

Consider first the interbus connection of FIG. 4B. Since capacitor 20 has a magnitude two thirds that of either capacitor 28 or 52, in accordance with prior art theory current $i_{2b}$ has twice the frequency of current $i_{1b}$ and half its amplitude. This is shown in FIG. 5B. If in a prior art system the cable inductors are added, the interbus operation remains the same provided the sampling period is increased slightly. The reason for showing capacitor 20 as two parallel capacitors is that by so doing each of the $i_{2b}$ loops is independent of the other. The two $i_{2b}$ currents are equal; the initial one volt potential on capacitor 28 causing the additional current $i_{1b}$ to flow as shown.

The second set of waveforms in FIG. 5B are designed to show the derivation of the waveform of the voltage across capacitor 28. The contribution of each of the two currents through capacitor 28 to the voltage across the element at any time, $t$, is determined by integrating the current with respect to time between the limits 0 and $t$ and dividing by C. The voltage across the capacitor is initially one volt. This voltage is reduced by current $i_{1b}$ flowing in the resonant circuit. The upper of the three waveforms in the middle set of FIG. 5B shows the voltage across capacitor 28 determined by the initial charge and current $i_{1b}$. Current $i_{2b}$ also causes the voltage across the capacitor to decrease and then increase as a function of time. The lower of the three curves in the group, the integral of current $i_{2b}$ with respect to time, shows the reduction in the voltage as a result of the second current. If the upper and lower waveforms in the middle set are added together, the total voltage across capacitor 28 as a function of time can be derived. This curve is shown in FIG. 5B. It is seen that at the end of the sampling period (of width $\tau$) the voltage across capacitor 28 is zero, which is desired.

The lower set of three curves in FIG. 5B are designed to show the voltage which builds up across capacitor 52. This voltage builds up as a result of current $i_{1b}$, but is decreased and then increased by current $i_{2b}$ flowing out of, then into, the capacitor. When the two integrated current waveforms are added together, the voltage curve for capacitor 52 is derived. As seen, the voltage across the capacitor is intially zero, then rises to one volt at the end of the sampling period. Thus, the ideal resonant transfer takes place (assuming that the circuit is ideally loss less); the cable inductors added to the system do not affect the interbus connection operation.

Figure 5A:
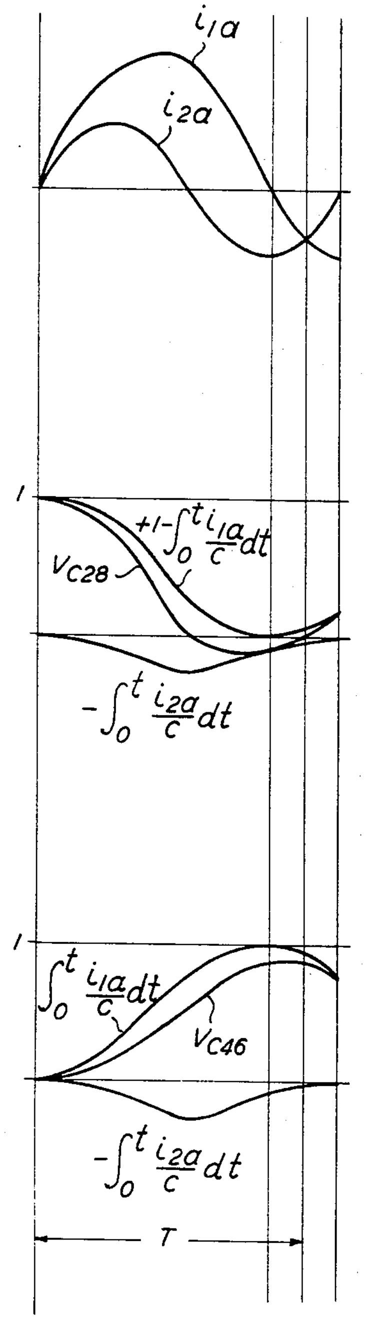
FIGS. 5A and 5B show various approximate voltage and current waveforms which appear in the intrabus and interbus connections of FIGS. 4A and 4B, and which are representative of the current and voltage waveforms of the actual connections.
Figure 5B:
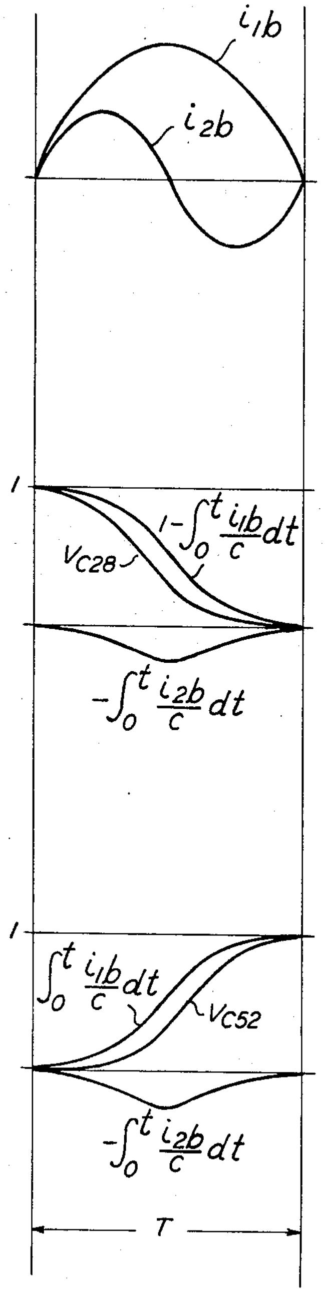

Consider now the intrabus connection of FIG. 4A and the waveforms of FIG. 5A. It is assumed that a constant sampling period is used in the system, namely, the increased period necessitated by the introduction of the cable inductors in order for the ideal resonant transfer to take place on interbus connections, or $\tau$. Since the resonant transfer circuit of FIG. 4A does not include inductors 54 and 58, the half-period of natural oscillation is less than the ideal interbus and system sampling pulse period $\tau$. This is shown in FIG. 5A where it is seen that the half-period of current $i_{1a}$ is less than $\tau$. Consider now current $i_{2a}$. Each $i_{2b}$ loop in FIG. 4B includes an inductor of magnitude L and another of magnitude BL. On the other hand, in FIG. 4A each $i_{2a}$ loop includes an inductor of magnitude L and another of magnitude 2BL. Consequently, the total inductance in each of the $i_{2a}$ loops in FIG. 4A is greater than the total inductance in each of the $i_{2b}$ loops in FIG. 4B and the period of current $i_{2a}$ is as a result greater than $\tau$. This is also shown in the upper set of waveforms of FIG. 5A.

Consider now the voltage across capacitor 28 as a function of time. The two integrated waveforms are drawn as they were in FIG. 5B. It is seen that the $i_{1a}$ integrated waveform touches the axis at a time prior to $\tau$, since the half-period of current $i_{1a}$ has been decreased. The $i_{2a}$ integrated waveform returns to the time axis at a time after $\tau$ since the period of the $i_{2a}$ waveform has been increased. The two integrated waveforms are once again added together to determine the total voltage across capacitor 28. While the voltage is slightly negative during part of the sampling period, it is seen that at the end of the sampling pulse period $\tau$ the voltage across the capacitor is zero. This is the desired result because, as was assumed, no driving voltage originally appeared across capacitor 46.

In a similar manner the waveform of the voltage across capacitor 46 can be determined. Referring to the lowest set of curves in FIG. 5A, it is seen that the integrated $i_{1a}$ waveform reaches its peak before time $\tau$ and then decreases. The $i_{2a}$ waveform is similar to the $i_{2b}$ waveform previously considered except that the curve returns to the axis at a time greater than $\tau$. When the two waveforms are added together, the middle curve, representing the voltage across capacitor 46 as a function of time, is produced. As seen in the drawing, at time $\tau$ the voltage across capacitor 46 is less than one volt $\tau$ being the peaking time. This is the desired result. Without any insertion loss the full one-volt potential across capacitor 28 would be transferred to capacitor 46. Because of the increased insertion loss introduced by the special inductor included in the connection, the voltage across capacitor 46 at the end of the sampling period is less than one volt.

What the preceding qualitative analysis has shown is that with the addition of the cable inductors (or equivalents such as longer, less-capacitive cables 16 and 18) in in prior art system, if all other elements are ideal, the insertion loss of an intrabus connection will be greater than that of an interbus connection. In a practical system the inductors still cause the same effect. However, since in a practical system the insertion loss of an intrabus connection without the inductors is less than that of an interbus connection, the additional inductors in a practical system cause the contrast between the two insertion losses to be reduced. By a quantitative analysis it is possible to determine the value of B which in any system having line inductors of mangitude L will determine the magnitude BL of the cable inductors. The value of B, of course, depends on the value of the insertion loss desired to be added to the intrabus connection. To control an additional insertion loss of 0.2 db, for example, B is equal to 0.136. It can also be shown that with B equal to 0.136 the sampling pulse width must be increased by 7 percent in order for the interbus connection resonant transfer to be unaffected.

Often, it is not desirable to increase the sampling pulse width. Thus, to obtain the advantages of the BL inductor, new system designs can simply specify a reduced value of the regular transfer inductor L by the amount BL to be added. This keeps the resonant transfer sampling period the same, which is often preferred.

Although the invention has been described with reference to a particular embodiment, it is to be understood that this embodiment is only illustrative of the application of the principles of the invention. Numerous modifications may be made therein and other arrangements may be devised without departing from the spirit and scope of the invention.

What is claimed is:

1. A time-division switching system comprising a plurality of groups of sampling capacitors, a plurality of group-busses each associated with a respective one of said groups of sampling capacitors, a plurality of groups of gating means, a plurality of groups of inductors, each of said gating means selectively connecting a respective one of said inductors between a respective one of said sampling capacitors and the respective one of said group-busses, an intergroup bus, a capacitor connecting said intergroup bus to ground potential, a plurality of cables, a plurality of other gating means operating concurrently with said gating means for selectively connecting respective ones of said cables to said intergroup bus, and a plurality of inductors each connecting one of said cables to a respective one of said group-busses.

2. A time-division switching system in accordance with claim 1 wherein each of said gating means is operated for a time period equal to one half the period of natural oscillation of a resonant circuit including a series connection of two of said sampling capacitors, two of said inductors in said plurality of groups, and two of said connecting inductors.

3. A time-division switching system comprising a plurality of groups of time-division terminal units, a plurality of group-busses each associated with a respective one of said groups of terminal units, a plurality of groups of gating means, each of said gating means selectively connecting a respective one of said terminal units to the respective one of said group-busses, an intergroup bus, a plurality of cables, a plurality of other gating means operating concurrently with said gating means selectively connecting respective ones of said cables to said intergroup bus, and a plurality of inductors each connecting one of said cables to a respective one of said group-busses.

4. A time-division switching system in accordance with claim 3 further including a capacitor connecting said intergroup bus to ground potential, and wherein each of said terminal units includes an inductor and a capacitor and each of said gating means is operated for a time interval greater than the half-period of natural oscillation of a resonant circuit including a series connection of two of said terminal units.

5. A time-division switching system comprising a first and a second plurality of time division terminal units, first connecting means for establishing connections between units of the same plurality, second connecting means connected to said first connecting means for establishing connections between units of different ones of said pluralities, said first and second connecting means operating concurrently, and means for including inductance means in series between said first and said second connecting means for connections between units of different ones of said pluralities and in shunt of said first connecting means for connections between units of the same plurality.

6. A time-division switching system in accordance with claim 5 wherein each of said terminal units includes a series connection of a capacitor and an inductor.

7. In a time-division switching system having means for establishing intrabus connections and interbus connections the improvement comprising an inductor and means for inserting said inductor in series with each interbus connection and in shunt with each intrabus connection said inductor inserting means operating concurrently with said connection establishing means.

8. In a time-division switching system, a plurality of intragroup busses, at least one intergroup bus, means for establishing intrabus and interbus connections, and means operating concurrently with said connection establishing means for equalizing the insertion loss of said intrabus and interbus connections, said last mentioned means including inductor means connecting said intragroup busses and said intergroup bus.

9. A time-division switching system comprising a first and a second plurality of subscriber sets, a first intragroup bus for establishing connections between said subscriber sets of said first plurality, a second intragroup bus for establishing connections between said subscriber sets of said second plurality, an intergroup bus for establishing connections between a subscriber of said first plurality and a subscriber of said second plurality, and means for balancing the intragroup bus connection insertion loss and the intergroup bus insertion loss, said means including inductor means connecting each of said intragroup busses to said intergroup bus whereby said inductor means are in series in each intergroup bus connection and means connected to said intergroup bus for connecting one of said inductor means in shunt in each intragroup bus connection.

References Cited

UNITED STATES PATENTS

| | | | |
|---|---|---|---|
| 3,251,947 | 5/1966 | Schlichte. | |
| 3,061,680 | 10/1962 | Frandel | 179—15 |
| 2,962,551 | 11/1960 | Johannesen | 179—15 |

RALPH D. BLAKESLEE, *Primary Examiner.*